United States Patent
Gonnet

(10) Patent No.: US 10,363,887 B2
(45) Date of Patent: Jul. 30, 2019

(54) GLAZING WITH EXTRUDED SEAL, TRIM AND CORE AND METHOD FOR MANUFACTURING THE GLAZING

(71) Applicant: SAINT-GOBAIN GLASS FRANCE, Courbevoie (FR)

(72) Inventor: Romain Gonnet, La Croix Saint Ouen (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 11 days.

(21) Appl. No.: 15/534,864

(22) PCT Filed: Dec. 11, 2015

(86) PCT No.: PCT/FR2015/053447
§ 371 (c)(1),
(2) Date: Jun. 9, 2017

(87) PCT Pub. No.: WO2016/092231
PCT Pub. Date: Jun. 16, 2016

(65) Prior Publication Data
US 2017/0349118 A1     Dec. 7, 2017

(30) Foreign Application Priority Data

Dec. 12, 2014 (FR) ...................................... 14 62330

(51) Int. Cl.
| | |
|---|---|
| *B60R 13/06* | (2006.01) |
| *B60R 13/04* | (2006.01) |
| *B60J 10/265* | (2016.01) |
| *B60J 10/36* | (2016.01) |
| *B60J 10/78* | (2016.01) |

(52) U.S. Cl.
CPC .............. *B60R 13/06* (2013.01); *B60J 10/265* (2016.02); *B60J 10/365* (2016.02); *B60J 10/78* (2016.02); *B60R 13/04* (2013.01)

(58) Field of Classification Search
CPC ........ B60R 13/06; B60R 13/04; B60J 10/265; B60J 10/365; B60J 10/78
USPC ......................................................... 296/1.08
See application file for complete search history.

(56) References Cited

U.S. PATENT DOCUMENTS

| | | | |
|---|---|---|---|
| 3,766,697 A | 10/1973 | Jackson | |
| 2010/0237644 A1* | 9/2010 | Senge | ..................... B60J 10/265 296/1.08 |
| 2012/0144751 A1* | 6/2012 | Schapitz | .................. B60J 10/78 49/431 |

FOREIGN PATENT DOCUMENTS

| | | |
|---|---|---|
| DE | 20 2010 013 082 U1 | 3/2012 |
| EP | 1 944 182 A1 | 7/2008 |
| FR | 1 353 442 A | 2/1964 |

(Continued)

OTHER PUBLICATIONS

International Search Report as issued in International Patent Application No. PCT/FR2015/053447, dated Mar. 22, 2016.

*Primary Examiner* — Joseph D. Pape
*Assistant Examiner* — Dana D Ivey
(74) *Attorney, Agent, or Firm* — Pillsbury Winthrop Shaw Pittman, LLP

(57) ABSTRACT

A vehicle glazing includes a glazed element, at least one portion of extruded seal, at least one trim having an outer face and an inner face, and a core, having an elongate form and having, in cross section, a head and a foot, wherein the portion of extruded seal is manufactured by molding a plastic material on the glazed element.

14 Claims, 1 Drawing Sheet

(56) References Cited

FOREIGN PATENT DOCUMENTS

| GB | 667945 A | 3/1952 |
|----|----------|--------|
| GB | 692057 A | 5/1953 |

\* cited by examiner

GLAZING WITH EXTRUDED SEAL, TRIM AND CORE AND METHOD FOR MANUFACTURING THE GLAZING

CROSS-REFERENCE TO RELATED APPLICATIONS

This application is the U.S. National Stage of PCT/FR2015/053447, filed Dec. 11, 2015, which in turn claims priority to French patent application number 1462330 filed Dec. 12, 2014. The content of these applications are incorporated herein by reference in their entireties.

The present invention relates to a vehicle glazing comprising a glazed element, at least one portion of extruded seal and at least one trim having an elongate form which extends along an edge of said glazed element and having an outer face visible from the outside of the vehicle and an inner face situated opposite said outer face.

This trim can have, for example, in cross section, a general form with a base and at least one wing extending from said base, said base being situated, when the trim is installed on the glazing, above an outer face of said portion of extruded seal and said trim being fixed to said portion of extruded seal with no intermediate fixing element.

The present invention relates also to the corresponding glazing manufacturing method.

Throughout the present document, the expression "trim" describes a glazing accessory, in particular an accessory of elongate form; it does not describe a vehicle bodywork element. Such a trim is used to visually distinguish the edge of the glazing, seen from outside; it often has a bright metallic (chromium plated) appearance or a colored appearance.

It is known practice to use trims consisting of U-shaped extruded sections which are fixed by clipping onto intermediate clips which are themselves attached to the extruded bead which is produced, for example, in a flexible polymer and which is present at the periphery of the glazing.

It is also known practice, notably from the patent documents GB 667945, GB 692057 and U.S. Pat. No. 3,766,697, to provide a core which is prefabricated then positioned under a trim, this core being then inserted into a rib provided for this purpose in an extruded bead which has been prefabricated independently of the core previously, before this insertion.

It is also known practice, notably from certain variants described in the European patent application number EP 1 944 182, to directly fix a trim to an extruded bead, with no intermediate clip.

That document discloses that at least one retaining element, notably in the form of an arrow, can be introduced into a hole formed on the outer face of the seal portion, this hole being able to emerge on the inner face of the seal portion; however, this retaining element is situated, in its final position, inside the seal portion: it does not pass fully through the seal portion and does not come into contact with the inner face of the seal portion.

This solution offers the advantage of being able to be adopted when the space available between the periphery of the glazing and the adjacent bodywork is small.

However, the fixing of the trim by this retaining element is not sufficiently reliable: even if a number of retaining elements are provided, the trim can be easily removed because it is sufficient to apply a movement in the same direction but in the direction opposite to the movement for introducing the retaining elements in the holes.

The aim of the present invention is to remedy the drawbacks of the prior art by proposing a trim which can be fixed removably, simply, quickly and reliably, to a portion of seal and in particular when the space available between the periphery of the glazing and the adjacent bodywork is small.

A particular aim of the invention is to allow for the presence of a trim when the portion of extruded seal which bears the trim is relatively high (of the order of 3 to 10 mm above the glazed element), while making it possible for the quantity of material of this portion of extruded seal to be reduced in order to reduce the risks associated with the manufacture of a thick portion of extruded seal.

Indeed, notably when a portion of extruded seal is manufactured by injecting material into a mold containing the glazed element, managing a correct injection of the material over increased thicknesses and in corresponding full volumes is complicated.

The present invention is thus based on a solution whereby an intermediate part is used to fix the trim to the glazing, this intermediate part making it possible to reduce the quantity of material needed for the portion of extruded seal. Furthermore, this intermediate part participates in the securing of the trim, particularly during the molding if the extruded seal is manufactured by molding on the glazed element.

The present invention thus relates to a vehicle glazing as claimed in claim 1. This glazing comprises a glazed element, at least one portion of extruded seal, at least one trim having an elongate form which extends along an edge of said glazed element and having an outer face visible from the outside of the vehicle and an inner face situated opposite said outer face, noteworthy in that a core, having an elongate form and having, in cross section, a head and a foot, is situated under said trim with at least a part of said head in contact with said inner face of the trim and said foot which protrudes under said trim with at least a part of said foot which is not in contact with said inner face of the trim, and in that said portion of extruded seal, seen in cross section, is in contact with said glazed element, said foot and a part of said outer face of the trim.

Said portion of extruded seal is manufactured by molding a plastic material on said glazed element.

Advantageously, the molding of the portion of extruded seal on said glazed element is a molding on the foot of said core which is prefabricated and which is provided with the trim.

The fact that the portion of extruded seal is manufactured by molding a plastic material on the glazed element greatly increases the complexity involved in the manufacturing of the glazing compared to a solution in which the portion of extruded seal is prefabricated independently of the glazed element or a solution in which the portion of extruded seal is manufactured by extrusion or molding on the glazed element; however, such manufacturing creates a chemical interaction between the prefabricated core and the portion of extruded seal during its molding on the glazed element.

This chemical interaction provokes, surprisingly, a phenomenon of adhesion between the two parts, the core and the extruded seal, which is not fully understood, and this adhesion actively participates in improving the mechanical strength over time of the glazing thus provided with the extruded seal, the core and the trim.

The analysis of the glazing according to the invention, when finished, shows this chemical interaction: the core cannot be separated from the extruded bead by manually pulling on the core.

Preferably, said head of the core is covered by the trim; all of said head is then in contact with said inner face of the trim; said portion of extruded seal is thus not in contact with said inner face of the trim.

Said trim has, preferably, in cross section, a form with a central base and at least one wing which extends from said base at a non-zero and non-flat angle.

Said portion of extruded seal is, preferably, in contact with a part of the wings of the trim, but is not in contact with the base of the trim.

Thus, at least half, even up to all of the outer face of a wing, or of each wing, is covered by the portion of extruded seal such that this overlap participates in the securing of the trim/core assembly by the portion of extruded seal.

Preferably, for the trim/core assembly to be well secured, said core adheres either directly, or via a glue, with said portion of extruded seal and/or said foot has, on at least a part of a contour, at least one longitudinal groove, even several longitudinal grooves, thus forming a sawtooth-form contour.

Said foot has, seen in cross section, a section which is wider in proximity to the head and which is narrower away from the head.

Preferably, said portion of extruded seal has, on the outer face, a hollow of a form complementing a perimeter of said foot.

In a variant, said trim comprises at least one tab which is situated on a longitudinal edge of said trim and which is folded back into contact with said foot. This tab, or each tab, is preferably holed.

In an additional variant, said trim comprises at least one opposite tab which is situated on an opposite longitudinal edge of said trim, that is to say a longitudinal edge that is transversely opposite the edge which comprises the first tab, and which is folded back into contact with said foot, This tab, or each tab, is preferably holed. The longitudinal distance (the longitudinal offset) between two tabs which are not arranged on the same longitudinal edge is preferably between 40 and 150 mm.

Said core has, preferably, a length equal to the length of said trim.

In a preferred version of the invention, said portion of extruded seal, seen in cross section, is in contact with an outer face, an inner face and an edge face of said glazed element and said trim is situated at least partly above said outer face of said glazed element.

Also preferably, said core is made of a different material from, on the one hand, the trim, and, on the other hand, said portion of extruded seal; said core is, preferably, made of plastic material.

Said core is, preferably, unique to the trim, in order to facilitate the molding; the profile or contour of the core may be constant over its entire length also in order to facilitate the molding.

To further increase the securing of the trim/core assembly by the portion of extruded seal, it is possible for said foot to comprise at least one transverse hole for the passage of the material of said portion of extruded seal.

Said core is preferably solid. It can possibly be hollow at its center.

Preferably, furthermore, all the perimeter of said foot is in contact with the material of said extruded bead.

The present invention relates also to a method for manufacturing a glazing according to the invention, said glazing comprising a glazed element, at least one portion of extruded seal, at least one trim having an elongate form which extends along an edge of said glazed element and having an outer face visible from the outside of the vehicle and an inner face situated opposite said outer face, noteworthy in that a core, having an elongate form and having, in cross section, a head and a foot, is positioned under said trim with at least a part of said head in contact with said inner face of the trim and said foot which protrudes under said trim with at least a part of said foot which is not in contact with said inner face of the trim, then in that said portion of extruded seal is manufactured by molding a plastic material on said glazed element, on said foot and on a part of said outer face of the trim with said portion of extruded seal, seen in cross section, which is in contact with said glazed element, said foot and a part of said outer face of the trim.

Preferably, said core adheres either directly, or via a glue, with said plastic material of said portion of extruded seal and/or said foot has, over at least a part of a contour, at least one longitudinal groove. This adhesion takes place, preferably, before the molding of said portion of extruded seal.

Said trim can comprise at least one tab which is situated on a longitudinal edge of said trim and which is then folded back into contact with said foot before the molding of said portion of extruded seal.

Advantageously, the present invention makes it possible to manufacture a glazing with trim and portion of extruded seal in which the portion of extruded seal has a significant height but a volume limited by the presence of the core which also serves to fix the trim.

This thus makes it possible to limit the risk of the occurrence of appearance defects (in the form of wrinkles or similar) on the outer face of the portion of extruded seal, in particular when this portion of extruded seal is manufactured by injection molding.

A number of embodiments of the present invention will be described hereinbelow, as nonlimiting examples, with reference to the attached drawings in which.

Figure 1:
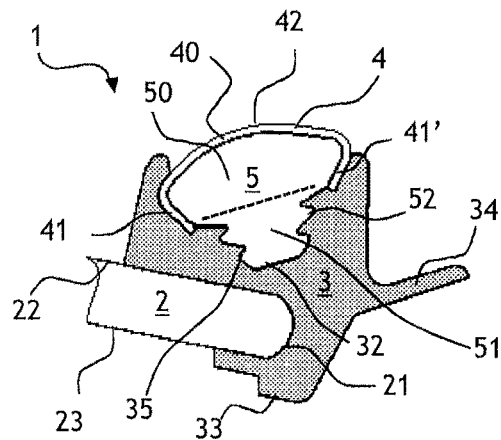
FIG. 1 illustrates a cross-sectional, view of a glazing according to the invention.

In these figures, the proportions between the different elements are observed in each figure, but the background elements are not generally represented, in order to facilitate the reading thereof.

The present invention relates to a vehicle glazing 1, comprising a glazed element 2, at least one portion of extruded seal 3 fixed to the glazed element, at least one added part, such as a trim 4 fixed to said portion of extruded seal 3.

In the context of the invention, the trim 4 is fixed to the portion of extruded seal by an intermediate fixing part described in detail hereinbelow.

The glazing 1 according to the invention which is illustrated is a fixed rear lateral .glazing of a Motor vehicle (rear side panel). It comprises a glazed element 2 which is provided with a portion of an extruded bead 3 made of a flexible polymer material which runs all around the glazed element 2.

The glazing 1, which possibly comprises an accessory (or accessories), and in particular a glazing fixing accessory (or accessories), is intended to close an aperture producing a separation between an interior space of the vehicle and a space outside the vehicle. The glazed element 2 thus has an outer face 22 intended to be turned toward the outside space, an inner face 23 intended to be turned toward the interior space, and a peripheral edge face 21.

The glazed element can be monolithic, that is to say consist of a single sheet of material, or be composite, that is to say consist of a number of sheets of material between which is inserted at least one layer of adhesive material in the case of laminated glazings. The sheet (or sheets) of material may be mineral, notably of glass, or organic, notably of plastic material.

In the case of glazing for a vehicle, the glazing generally has, at least partially on its periphery, an embellishing strip (not illustrated).

When the glazed element is made of organic material, it has been manufactured prior to the implementation of the invention by molding of the material constituting the glazed element in a molding device comprising a mold comprising at least one fixed mold part and one mobile mold part which is mobile relative to the fixed mold part, said mold parts cooperating in the closed state of the mold, during the molding step, to form a molding cavity which, in cross section, presents the cross-sectional form of the glazed element. Often, the glazed element made of organic material is not flat but dished.

When the glazed element is made of mineral material, it has been manufactured prior to the implementation of the invention by the melting of mineral material in a flat sheet, then by the cutting of this sheet and possibly dishing and/or tempering of this sheet.

In the figures, the glazed element 2 is a monolithic glazing. The glazing illustrated is a fixed glazing, but the present invention can also be applied to a mobile glazing.

The portion of extruded seal 3 thus has an outer face 32 which is intended to be oriented toward the outside of the vehicle, and an inner face 33 which is intended to be 10. oriented toward the interior of the vehicle.

The polymer material constituting the extruded bead 3 can be a thermoplastic (PVC, TPE, etc.), a polyurethane, or even a synthetic rubber of EPDM type, or any other suitable material.

The extruded bead 3 is, preferably, manufactured by the implementation of a manufacturing method called "encapsulation" because it comprises a step of molding of the extruded bead 3 in a molding device, between two molding elements, one molding element accommodating the inner face of the glazing and one molding element accommodating the outer face of the glazing, these two molding elements being closed on to one another during the molding step while producing between them a molding cavity which is filled with the material that constitutes the extruded bead during the step of molding of this bead.

The extruded bead 3 is, preferably, arranged over the entire periphery of the glazing 1, but this extruded bead could perfectly well be positioned only on a part of the periphery of the glazing or on any part of the glazing.

In the figures, the trim 4 thus covers a portion of the outer face 32 of the extruded seal.

It is to improve the esthetic appearance of the glazing that a part of the extruded bead 3 visible from the outside of the vehicle is masked by the trim 4.

The trim 4 has an elongate form which extends along an edge of said glazed element 2 and has an outer face 42 visible from the outside of the vehicle, an inner face 43 situated opposite said outer face 42, and an edge face 44 situated between these two faces.

The trim is prefabricated: it has been manufactured, and possibly shaped, prior to the fixing thereof to the glazing. It can be made of aluminum, aluminum alloy, steel and in particular stainless steel.

The material of which it is made preferably exhibits a modulus of elasticity of between $60.10^3$ MPa and $250\ 10^3$ MPa in order to make it possible to manually apply a plastic deformation to the tab or tabs.

The trim has a complex (non-planar) form: it has, in cross section, a form with a central base 40 and at least one wing 41, 41' which extends from said base. This form is positioned inverted with the base situated above, or, specifically here, on, the outer face 32 of said portion of extruded seal 3.

According to the invention, an intermediate part is used; the trim 4 is fixed onto this intermediate part and this intermediate part is in turn fixed to the extruded bead 3.

This intermediate part is a core 5 having an elongate form and having, in cross section, a head 50 and a foot 51. The core 5 is situated under the trim 4 with at least a part of said head 50 in contact with said inner face 43 of the trim 4 and said foot 51 which protrudes under said trim 4 with at least a part of said foot 51 which is not in contact with said inner face 43 of the trim 4.

Figure 2:
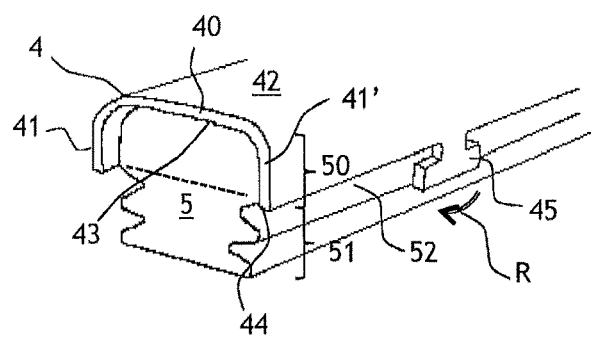
FIG. 2 is a partial perspective view of the trim and of the core of the glazing of FIG. 1 before a tab of the trim has been folded back.

The dotted line that can be seen in the middle of the core 5 in FIGS. 1 and 2 illustrates the divide between the head 50 and the foot 51.

Figure 3:
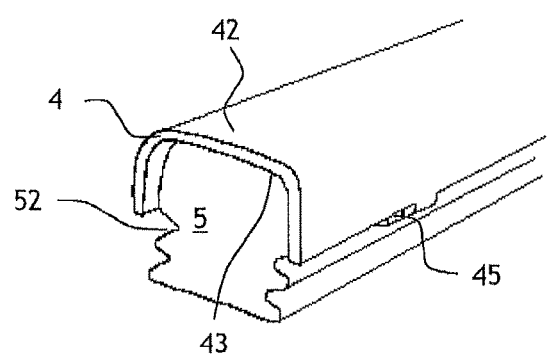
FIG. 3 is a view similar to FIG. 2, after the tab of the trim has been folded back.

As can be seen in FIGS. 1 to 3, preferably, the head 50 of the core is completely covered by the trim 4; said portion of extruded seal is not therefore in contact with the head 51.

The core 5 is solid; it can, for example, be made of polypropylene (PP) and the extruded seal 3 can, for example, be made of thermoplastic elastomer (TPE).

Moreover, the portion of extruded seal 3, seen in cross section, at any point along the length of the core, is in contact with said glazed element 2, said foot 51 and just a part of said outer face 42 of the trim 4.

As can be seen in FIG. 1, the portion of extruded seal 3 is in contact with a part of the wings 41, 41' of the trim 4 but is not in contact with the base 40 of the trim.

Thus, at least half, even up to all of the outer face of the wings, is covered by the portion of extruded seal 3 such that this covering participates in the securing of the trim/core assembly by the portion of extruded seal. The core and the trim both form an assembly of two distinct parts fixed to one another. This fixing is mechanical, even also chemical.

It is thus possible for the trim 4 to be glued onto the head 50 of the core in order to produce a chemical fixing.

FIGS. 2 and 3 illustrate the mechanical fixing; the trim comprises at least one tab 45, which can possibly be holed in order for the material of the extruded seal to be able to penetrate into this opening and further increase the securing of the core/trim assembly by the extruded bead.

The tab 45 is situated on a longitudinal edge of the trim 4 and, more specifically, it extends in the continuity of the edge face 44 of the trim 4, as can be seen more specifically in FIG. 2. The arrow R illustrates the folding-back movement of the tab 45.

FIG. 3 illustrates this tab 45 after it has been folded back into contact with the foot 51, and more specifically here, after it has been folded back into a groove 52.

It is possible to provide for the trim 4 to comprise a number of tabs which are all situated on a same longitudinal edge of the trim 4 and which are folded back into contact with the foot 51.

It is also possible for the trim 4 to comprise at least one opposite tab which is situated on an opposite longitudinal edge and which is folded back into contact with said foot 51.

According to the invention, the core/trim assembly is secured by the extruded bead. This securing is a mechanical and/or chemical securing.

For a chemical securing, the core 5 adheres, either via a glue, or directly, with the portion of extruded seal 3, depending on the nature of the plastic material of the portion of extruded seal 3.

For a mechanical securing, said foot 51 has, as can be seen in FIGS. 1 to 3, over at least a part of a contour, at least one longitudinal groove 52, even several longitudinal grooves, which thus form a sawtooth contour.

Here, the contour is only partially sawtooth: it is sawtooth only on the left and right lateral sides (when seen in cross section as in FIG. 1), but not over its bottom part, in order for the quantity of portion of extruded seal to be sufficient between the core and the glazed element to correctly secure the core/trim assembly.

The portion of extruded seal 3 has, on the outer face 32, a hollow 35 of a form complementing a perimeter of said foot 51.

To increase the securing of the core/trim assembly, the foot 51 has, seen in cross section, a section which is wider in proximity to the head 50 and which is narrower away from the head 50.

The core 5 has, preferably, a length equal to the length of the trim 4.

It is therefore important for the head 50 to have a length equal to the length of the trim 4; it is possible for the foot 51 to be shorter than the trim 4 but this reduces the securing of the core by the portion of extruded seal; or for the foot 51 to be longer than the trim 4 and this increases the securing of the core by the portion of extruded seal.

In the exemplary embodiment illustrated in FIG. 1, the portion of extruded seal 3, seen in cross section, is in contact with the outer face 22, the inner face 23 and the edge face 21 of the glazed element 2 and the trim 4 is, mostly, above said outer face 22 of said glazed element 2; the portion of extruded seal 3 has a relatively great thickness above the outer face 22 but the quantity of material necessary to produce this portion is reduced by virtue of the volume occupied by the core, which facilitates the manufacturing of the extruded seal 3, in particular when it is manufactured by injection molding. In effect, it is still complicated to perform a molding injection in a large volume.

When the extruded seal 3 is manufactured by injection, it is essential to first assemble the core with the trim such that at least a part of the head 50 is in contact with said inner face 43 of the trim 4 and for the foot 51 to protrude under the trim 4 with at least a part of the foot 51 which is not in contact with said inner face 43 of the trim 4, but the core/trim assembly is positioned in the injection mold for the portion of extruded seal and finally this portion of extruded seal 3 is manufactured by molding a plastic material on said glazed element 2.

Through this molding, the portion of extruded seal 3 is molded on said foot 51 and on a part of said outer face 42 of the trim 4 with said portion of extruded seal 3, seen in cross section, which is in contact with said glazed element 2, said foot 51 and a part of said outer face 42 of the trim 4.

To allow for the molding, the core/trim assembly is secured in the molding cavity by means that are known in themselves of securing-finger type or by magnet(s) if the trim is metallic.

The invention claimed is:

1. A vehicle glazing, comprising a glazed element, at least one portion of extruded seal, at least one trim having an elongate form which extends along an edge of said glazed element and having an outer face visible from an outside of a vehicle on which the vehicle glazing is to be mounted and an inner face situated opposite said outer face, and a core, having an elongate form and having, in cross section, a head and a foot, said core being situated under said trim with at least a part of said head in contact with said inner face of the trim and said foot which protrudes under said trim with at least a part of said foot which is not in contact with said inner face of the trim, said portion of extruded seal, seen in cross section, being in contact with said glazed element, said foot and a part of said outer face of the trim, wherein said portion of extruded seal is manufactured by molding a plastic material on said glazed element, on said foot and on the part of said outer face of the trim.

2. The glazing as claimed in claim 1, wherein said core adheres either directly, or via a glue, with said portion of extruded seal and/or said foot has, on at least a part of a contour, at least one longitudinal groove.

3. The glazing as claimed in claim 1, wherein said portion of extruded seal has, on the outer face, a hollow of a form complementing a perimeter of said foot.

4. The glazing as claimed in claim 1, wherein said foot has, seen in cross section, a section which is wider in proximity to the head and which is narrower away from the head.

5. The glazing as claimed in claim 1, wherein said trim comprises at least one tab which is situated on a longitudinal edge of said trim and which is folded back into contact with said foot.

6. The glazing as claimed in claim 5, wherein said trim further comprises at least one opposite tab which is situated on an opposite longitudinal edge of said trim and which is folded back into contact with said foot.

7. The glazing as claimed in claim 1, wherein said core has a length equal to a length of said trim.

8. The glazing as claimed in claim 1, wherein said portion of extruded seal, seen in cross section, is in contact with an outer face, an inner face and an edge face of said glazed element and wherein said trim is situated at least partly above said outer face of said glazed element.

9. The glazing as claimed in claim 1, wherein said foot comprises at least one transverse hole for a passage of the material of said portion of extruded seal.

10. A method for manufacturing a vehicle glazing, said vehicle glazing comprising a glazed element, at least one portion of extruded seal, at least one trim having an elongate form which extends along an edge of said glazed element and having an outer face visible from an outside of a vehicle on which the vehicle glazing is to be mounted and an inner face situated opposite said outer face, and a core, having an elongate form and having, in cross section, a head and a foot, said core being positioned under said trim with at least a part of said head in contact with said inner face of the trim and said foot which protrudes under said trim with at least a part of said foot which is not in contact with said inner face of the trim, the method comprising manufacturing said portion of extruded seal by molding a plastic material on said glazed element, on said foot and on a part of said outer face of the trim with said portion of extruded seal, seen in cross section, which is in contact with said glazed element, said foot and a part of said outer face of the trim.

11. The method as claimed in claim 10, wherein said core adheres either directly, or via a glue, with said plastic material of said portion of extruded seal and/or said foot has, over at least a part of a contour, at least one longitudinal groove.

12. The method as claimed in claim 10, wherein said trim comprises at least one tab which is situated on a longitudinal edge of said trim and which is folded back into contact with said foot before the molding of said portion of extruded seal.

13. The method as claimed in claim 12, wherein said trim further comprises at least one opposite tab which is situated on an opposite longitudinal edge of said trim and which is folded back into contact with said foot before the molding of said portion of extruded seal.

14. The glazing as claimed in claim 1, wherein the trim has, in cross section, a central base and two opposite wings which extend from two opposite edges of said base and wherein said portion of extruded seal, seen in cross section, is in contact with said two opposite wings.

\* \* \* \* \*